(12) United States Patent
Hsu et al.

(10) Patent No.: US 6,637,833 B2
(45) Date of Patent: Oct. 28, 2003

(54) GUIDING AND FIXED STRUCTURE FOR A WHEEL COVER OF A HEAVY-DUTY VEHICLE

(76) Inventors: Long-Chuan Hsu, No. 39, Sha Luen, Chung Sha Vill., An Din Hsiang, Tainan Hsien (TW); Long-Hung Hsu, No. 46, Sha Luen, Chung Sha Vill., An Din Hsiang, Tainan Hsien (TW); Gary E. Adamson, 53395 Pheasant Ridge Dr., Bristol, IN (US) 46507

( * ) Notice: Subject to any disclaimer, the term of this patent is extended or adjusted under 35 U.S.C. 154(b) by 0 days.

(21) Appl. No.: 10/087,798

(22) Filed: Mar. 5, 2002

(65) Prior Publication Data

US 2003/0168907 A1 Sep. 11, 2003

(51) Int. Cl.[7] .............................. B60B 7/14; B60B 21/00; B60B 27/00
(52) U.S. Cl. ............................ 301/37.376; 301/37.102; 301/37.371; 301/108.4
(58) Field of Search ..................... 301/37.371, 37.101, 301/37.102, 37.34, 37.372, 37.376, 35.628, 35.629, 108.1, 108.4

(56) References Cited

U.S. PATENT DOCUMENTS

| | | | | |
|---|---|---|---|---|
| 2,237,481 A | * | 4/1941 | Ferro | 301/35.1 |
| 3,597,003 A | * | 8/1971 | Kraus | 301/40.6 |
| 3,918,764 A | * | 11/1975 | Lamme | 301/37.21 |
| 4,761,040 A | * | 8/1988 | Johnson | 301/37.376 |
| 4,971,396 A | * | 11/1990 | Morris | 301/37.376 |
| 5,263,770 A | * | 11/1993 | Goudey | 301/37.376 |
| 5,358,313 A | * | 10/1994 | Polka | 301/37.376 |
| 5,362,134 A | * | 11/1994 | Carmona | 301/35.629 |
| 5,503,465 A | * | 4/1996 | Price et al. | 301/37.374 |
| 5,542,750 A | * | 8/1996 | FitzGerald | 301/37.376 |
| 5,669,672 A | * | 9/1997 | Wright et al. | 301/37.371 |
| 5,695,257 A | * | 12/1997 | Wright et al. | 301/37.371 |
| 5,853,228 A | * | 12/1998 | Patti et al. | 301/37.371 |
| 5,957,542 A | * | 9/1999 | Boothe et al. | 301/37.25 |
| 6,003,955 A | * | 12/1999 | Ladd | 301/37.34 |
| 6,048,036 A | * | 4/2000 | Alaoui | 301/37.376 |
| 6,517,167 B2 | * | 2/2003 | Baker | 301/37.25 |

* cited by examiner

Primary Examiner—S. Joseph Morano
Assistant Examiner—Jason R. Bellinger
(74) Attorney, Agent, or Firm—Rosenberg, Klein & Lee

(57) ABSTRACT

A wheel covering apparatus for a heavy-duty vehicle is provided. The wheel covering apparatus includes a bracket that attaches to a wheel of the vehicle. The bracket has extending therefrom a guiding rod and a guiding barrel. The apparatus further includes a wheel cover and a wheel axle cover coupled thereto. The wheel cover is formed with an engagement hole and a guiding hole disposed in open communication with one another, such that the guiding hole may receive and transversely guide the guiding rod into engagement with the engagement hole. The wheel cover and wheel axle cover are secured to the bracket by a bolt passing therethrough to engage a threaded hole formed in the bracket.

4 Claims, 12 Drawing Sheets

GUIDING AND FIXED STRUCTURE FOR A WHEEL COVER OF A HEAVY-DUTY VEHICLE

BACKGROUND OF THE INVENTION

1. Field of the Invention

This invention relates to a guiding and fixed structure for a wheel cover of a heavy-duty vehicle, more particularly to a rear wheel of a truck having the wheel indent inwardly from outside towards inside and having the center portion bulk out again.

2. Description of Related Prior Art

Many owners of vehicles like to decorate their vehicles, one of the ways is to attach a wheel cover on a wheel, which is normally secured by the screws of the wheel. However, due to different manufacturers of the wheels and vehicles, each has a different specification, thus many inventions are derived with their own structure of fixing the wheel cover onto the wheel, such as U.S. Pat. Nos. 2,237,481, 3,597,003, 3,918,764, 4,971,396, 5,503,465, 5,542,750, 5,669,672, 5,695,257, 5,853,228 and 6,048,036, Canadian Patent Nos. 454,919 and 925,539,French Patent No. 2470-836, EPC No. EP0421000, Japanese Patent No. JP40-2-2171301. PCT Nos. WO/91/08916 and WO/91/11337. . . etc. All of those patents have disclosed either a U-shaped or a radius shaped fixture structure, with guiding holes and C-shaped nuts. All these designs comprise locating holes corresponding to holes of a wheel and secured by nuts to the wheel. Non of these designs is convenient to users for installation, especially installing the wheel cover onto the rear wheel, which has a protruding portion for an axle to extend thereat, thus it requires at least two or more people to perform the installation.

SUMMARY OF THE INVENTION

It is the primary object of the present invention to provide a guiding and fixed structure for a wheel cover of a heavy-duty vehicle, which is easy to install.

It is another object of the present invention to provide a guiding and fixed structure for a wheel cover of a heavy-duty vehicle, which uses threads to secure the wheel cover onto the wheel that provides a better connection and prevents the cover from loosening.

It is a further object of the present invention to provide a guiding and fixed structure for a wheel cover of a heavy-duty vehicle, which is inexpensive in manufacture.

BRIEF DESCRIPTION OF THE DRAWINGS

FIG. 2 A is a partially sectioned side view of the present invention incorporated with a wheel cover;

DETAILED DESCRIPTION OF THE PREFERRED EMBODIMENTS

Figure 1:
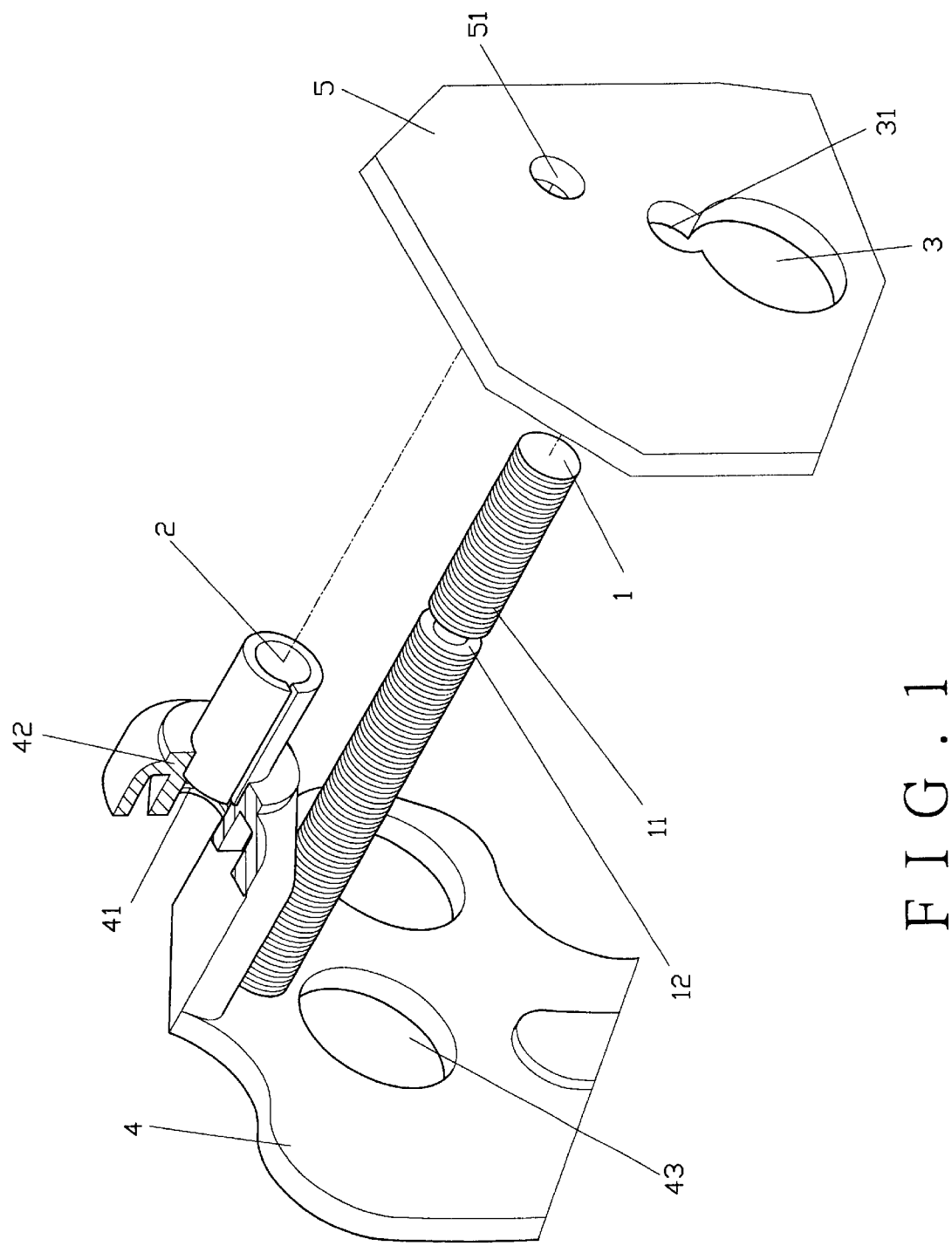
FIG. 1 is an exploded view of the present invention.
Figure 2:
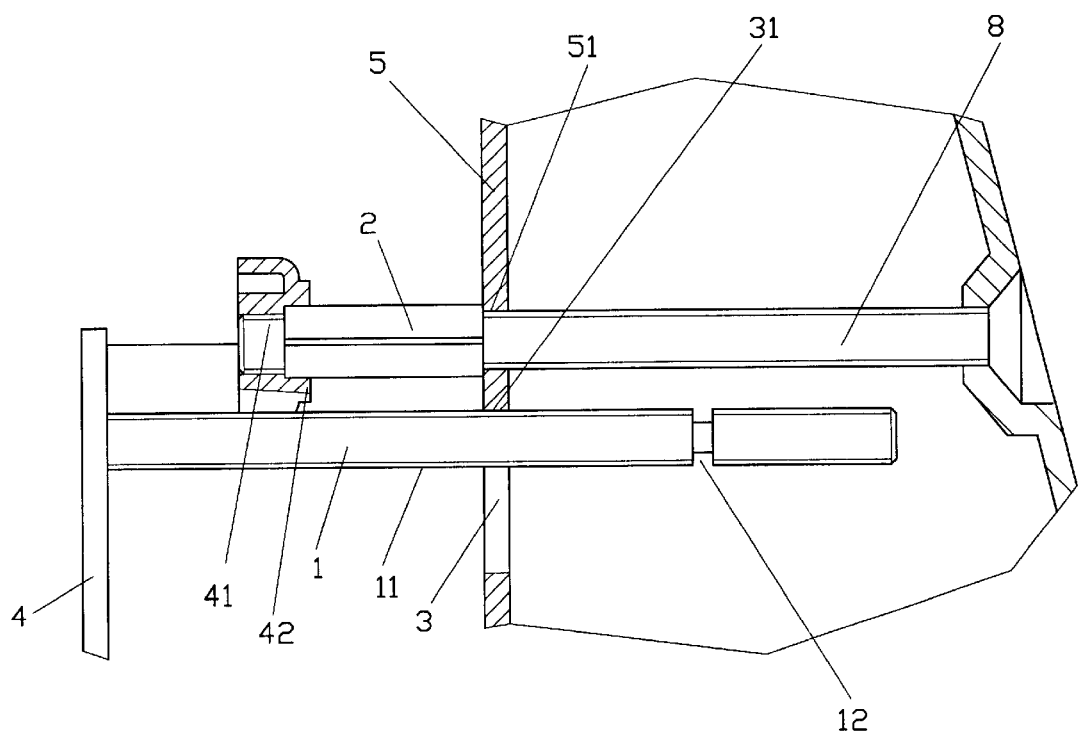
FIG. 2 is a side view of the present invention, partially sectioned.

Reference is now made to FIGS. 1 and 2 of the present invention, which comprises a guiding rod 1, a guiding barrel 2, a guiding hole 3, a bracket 4, and a wheel cover 5, which has a wheel axle cover 7 secured to the center portion thereof, both the wheel cover 5 and the wheel axle cover 7 comprise locating holes 51 and 71, respectively.

The guiding rod 1 comprises male threads 11 or circular threads (not shown in this figure) to lock the wheel cover 5 from loosening, and a reduced portion 12 at the center portion thereof, which is breakable in order to adjust the length of the guiding rod 1.

The guiding hole 3 is formed on the wheel cover 5 and comprises a small hole 31.

The bracket 4 has a threaded hole 41 with a hole 42, and further comprises a locating hole 43.

Figure 2A:
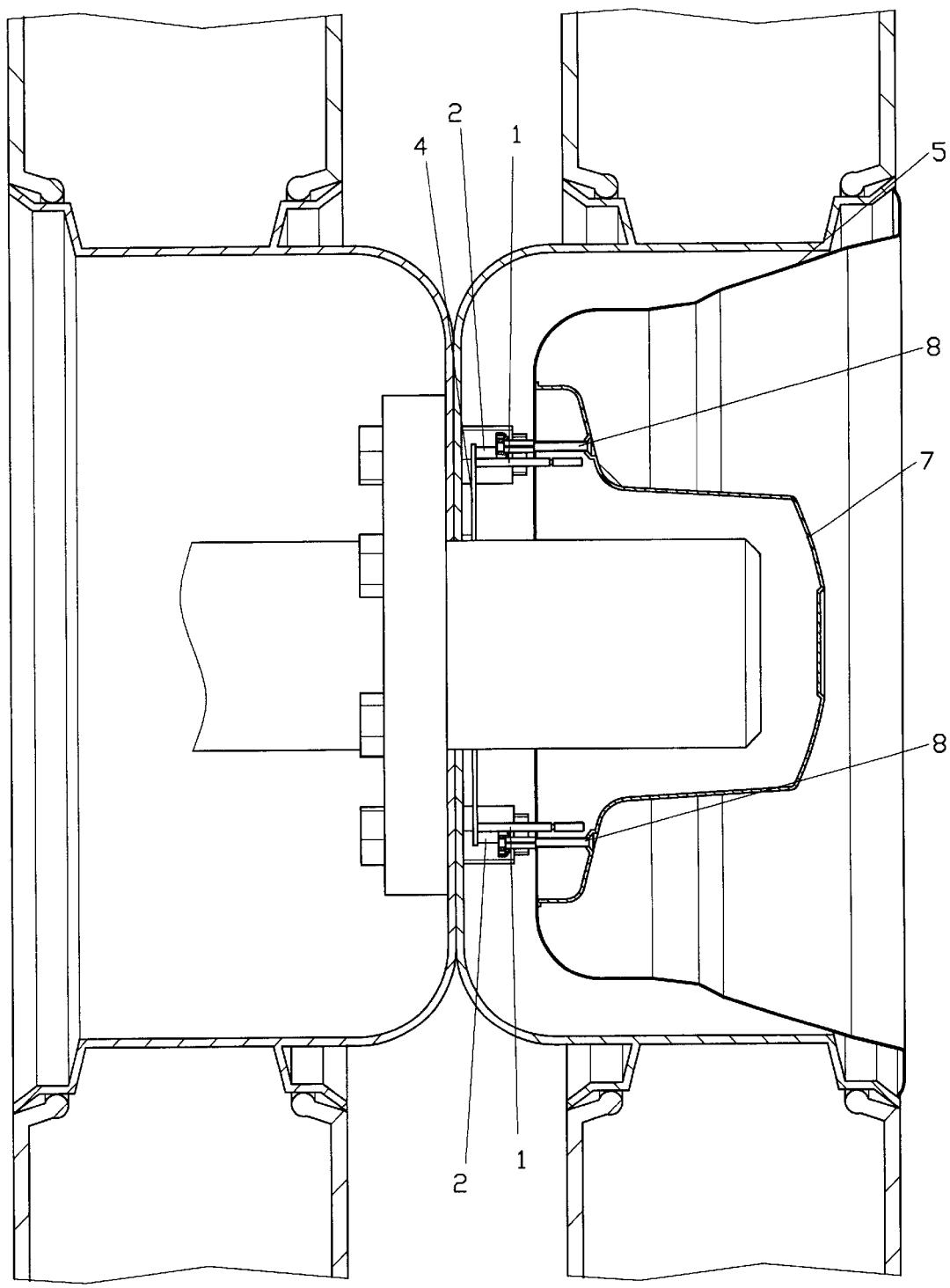
Figure 8:
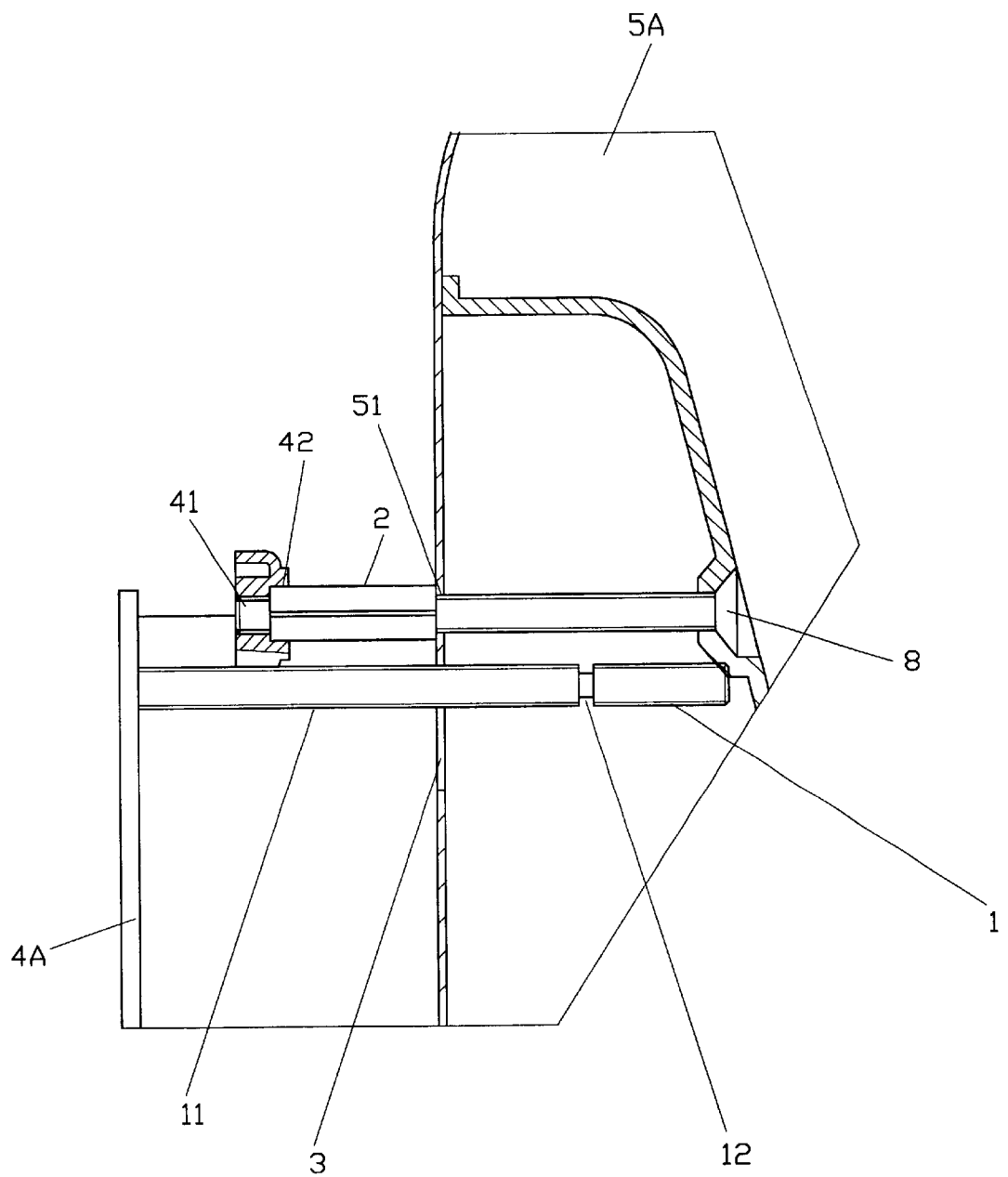
FIG. 8 is a side sectional view of the present invention incorporated the wheel cover, which indicates a third step of install the present invention.
Figure 11:
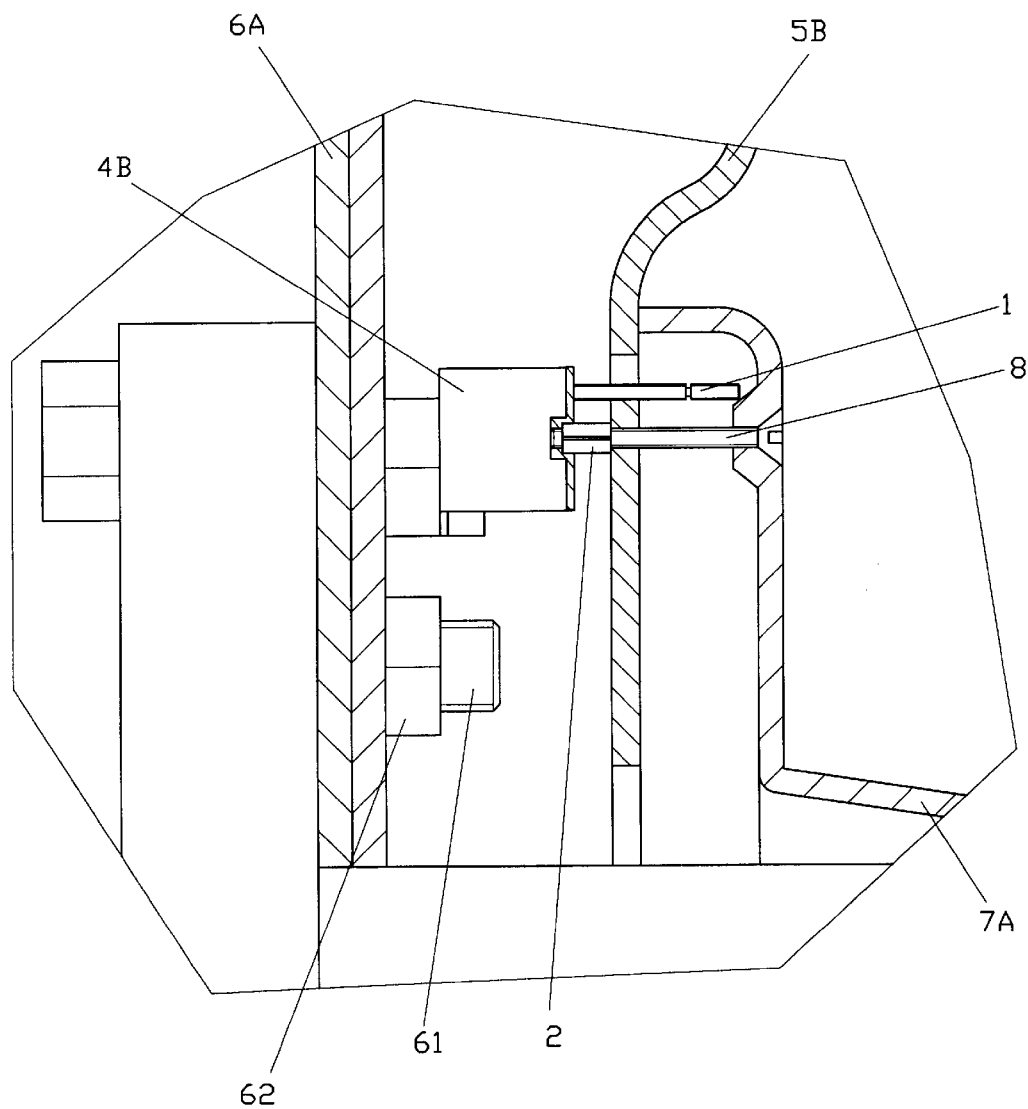
FIG. 11 is a side sectional view of the second embodiment of the present invention incorporated with the wheel cover.

The guiding rod 1 is secured on the bracket 4 next to the threaded hole 41. The threaded hole 41 is coaxial with the guiding barrel 2, and the guiding hole 3 is formed on the wheel cover 5 with the small hole 31 to guide the guiding rod 1 in place. The guiding barrel 2 and the threaded hole 41 are aligned with the locating hole 51 of the wheel cover 5 and the locating hole 71 of the wheel axle cover 7. Due to the guiding rod 1 being longer than the guiding barrel 2, the guiding rod 1 will reach the wheel cover 5 first. The locating hole 3, at this moment will guide the guiding rod 1, which then is slid into the small hole 31 and is restrained from movement therein, as shown in FIGS. 2 and 2A. The guiding barrel 2 and the threaded hole 41, at this time, align with the locating hole 51 of the wheel cover 5 and the locating hole 71 of the wheel axle cover 7, and are inserted with a bolt 8 therein to secure the bracket 4 to the wheel cover 5, as shown in FIGS. 8 and 11.

Figure 3:
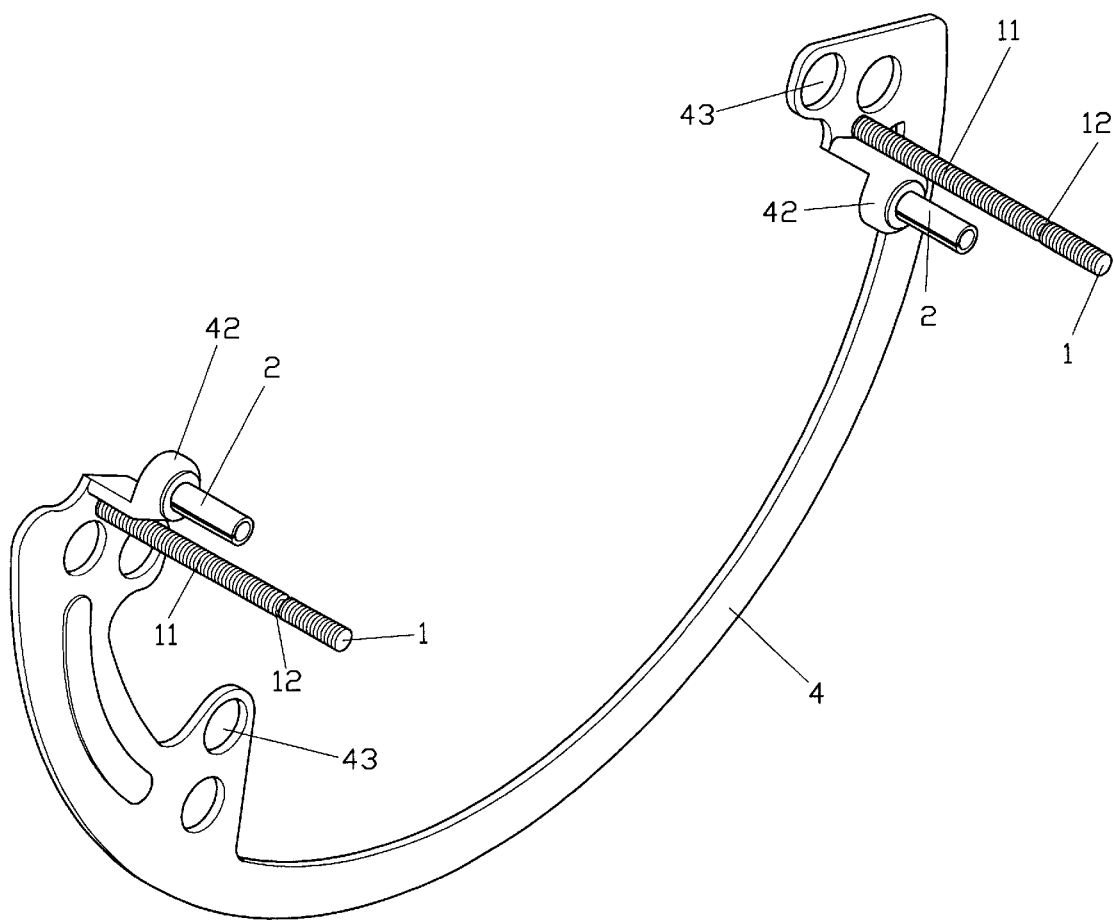
FIG. 3 is a perspective view of the first embodiment of the present invention.
Figure 4:
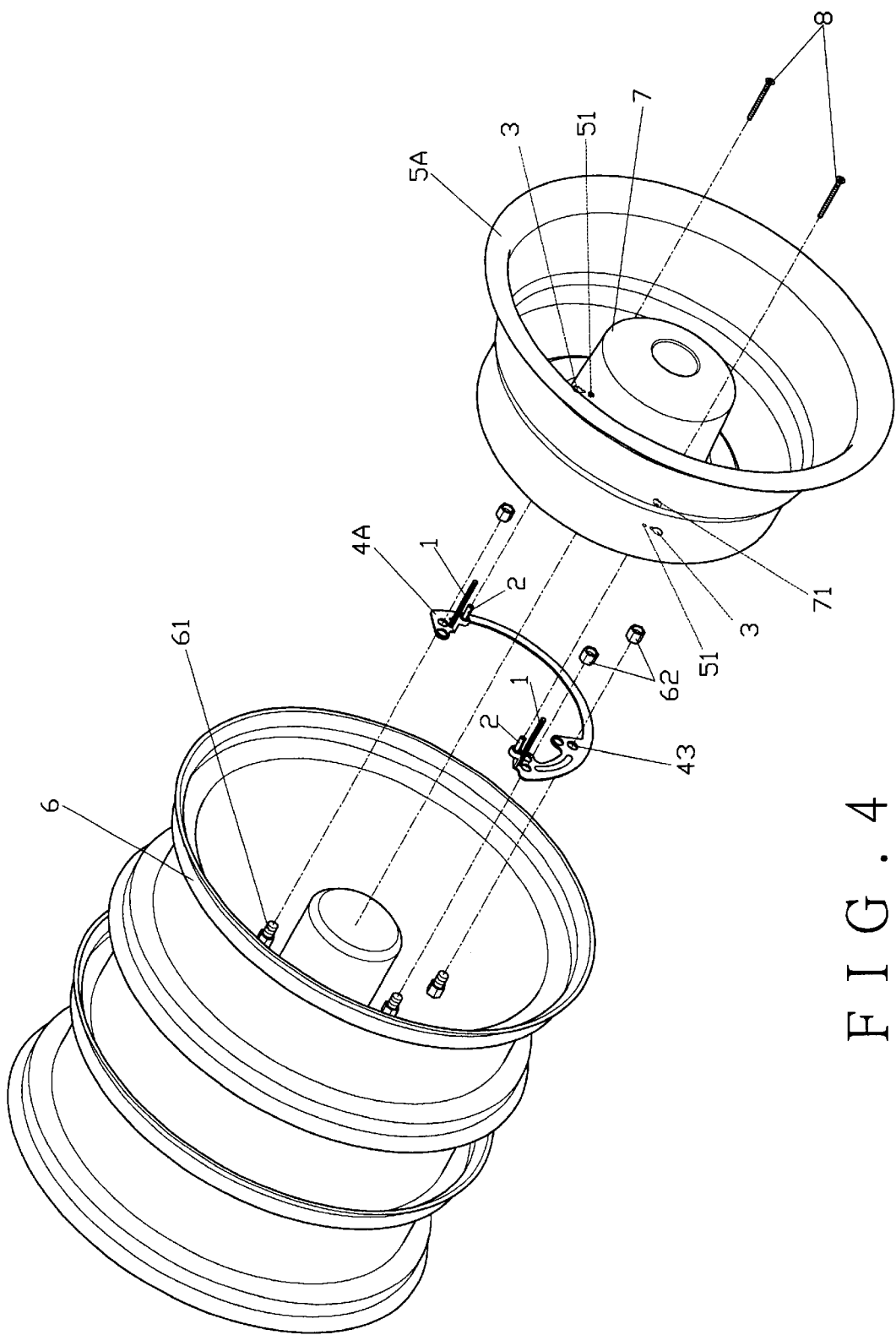
FIG. 4 is an exploded view of the present invention incorporated with a wheel cover.
Figure 5:
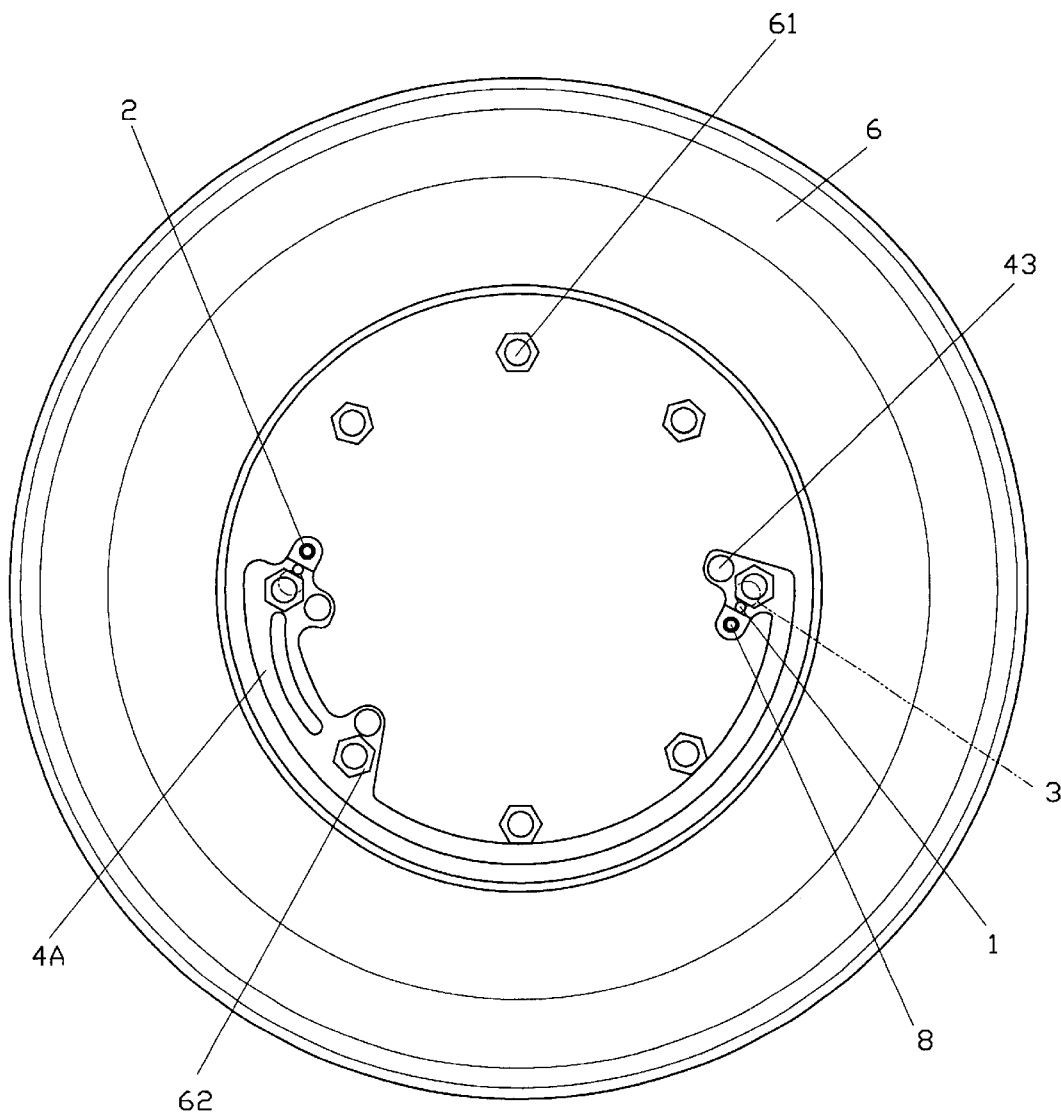
FIG. 5 is a front sectional view of the present invention incorporated the wheel cover.

Referring is now made to FIGS. 3 through 5, wherein an actual design of the guiding and fixed structure for the wheel cover of a first embodiment is shown, which comprises a pair of guiding rods 1, a pair of guiding barrels 2, a pair of guiding holes 3, a bracket 4A, a wheel cover 5A, a wheel 6, a wheel axle cover 7 and bolts 8. The wheel cover 5A is secured with the wheel axle cover 7, and both comprise locating holes 51 and 71 thereon.

The bracket 4A comprises locating holes 43 which correspond to bolts 61 of a wheel 6 from the original maker of the vehicle, so that the bolts 61 may be inserted through the locating holes 43 and secured by nuts 62 from the other side. The wheel cover 5A comprises a pair of guiding holes 3 as well. The wheel cover 5A and the wheel axle cover 7 are secured to the bracket 4A by means of the bolts 8 inserted through the locating holes 51 and 71.

Figure 6:
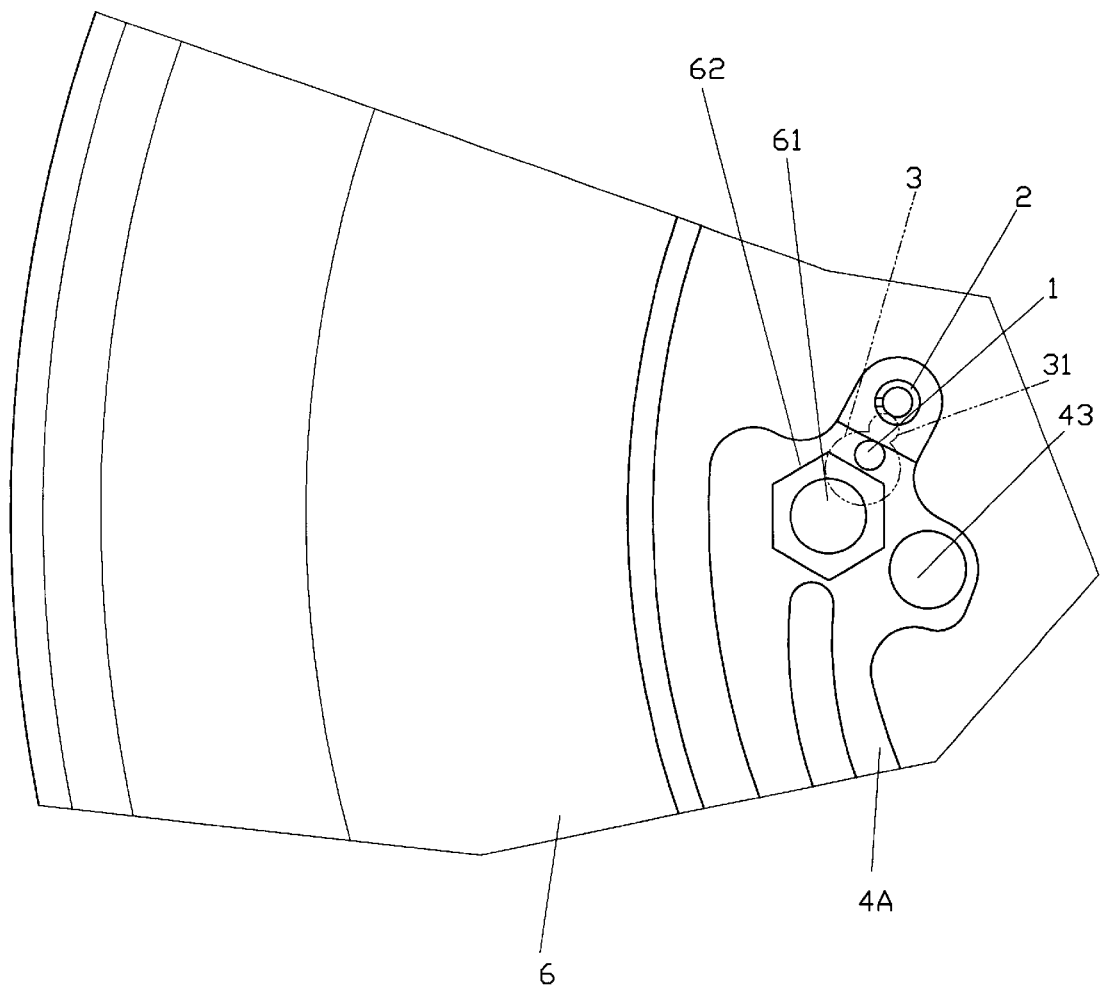
FIG. 6 is a side sectional view of the present invention incorporated the wheel cover, which indicates a first step of install the present invention.
Figure 7:
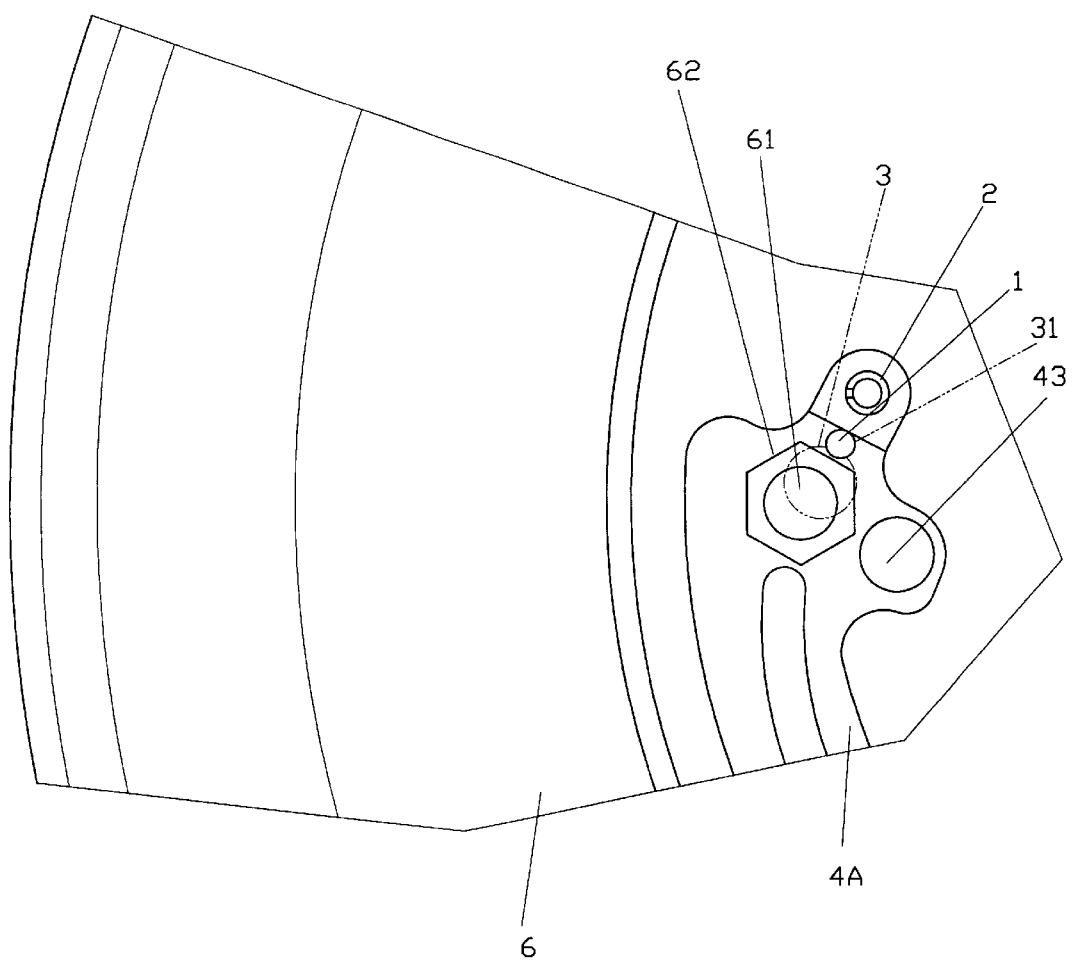
FIG. 7 is a side sectional view of the present invention incorporated the wheel cover, which indicates a second step of install the present invention.

FIGS. 6 and 7 illustrate the installation of the wheel cover 5A, whereas the bracket 4A is secured by the bolts 61 from one side and secured by the nuts 62 from the other side. The guiding rod 1 is inserted into the guiding hole 3, and then turn the wheel cover 5A, which will lead the guiding rod 1 to slide into the small hole 31 continually pushing the wheel cover 5A to the wheel 6 until the guiding barrel 2 reaches the inner end of the wheel cover 5A, whereas the guiding barrel 2 will align with the locating holes 51 and 71, the bolt 8 inserted through the locating holes 51, 71 and the guiding barrel 2 is threaded in the threaded hole 41 of the bracket 4, as shown in FIG. 8.

Figure 9:
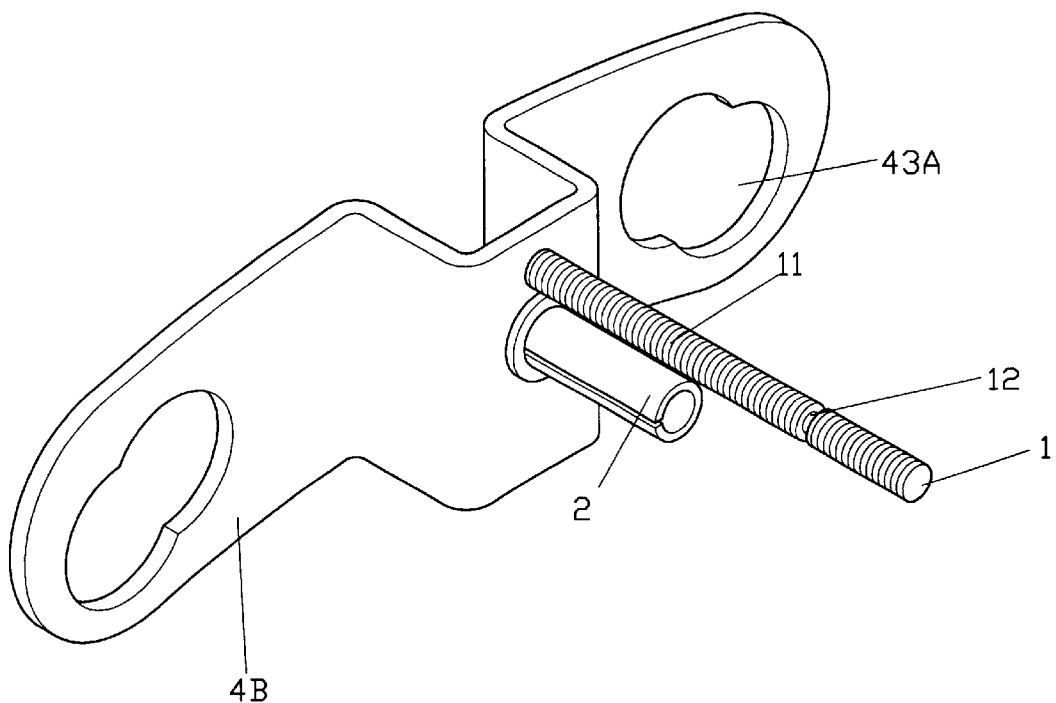
FIG. 9 is a perspective view of a second embodiment of the present invention.
Figure 10:
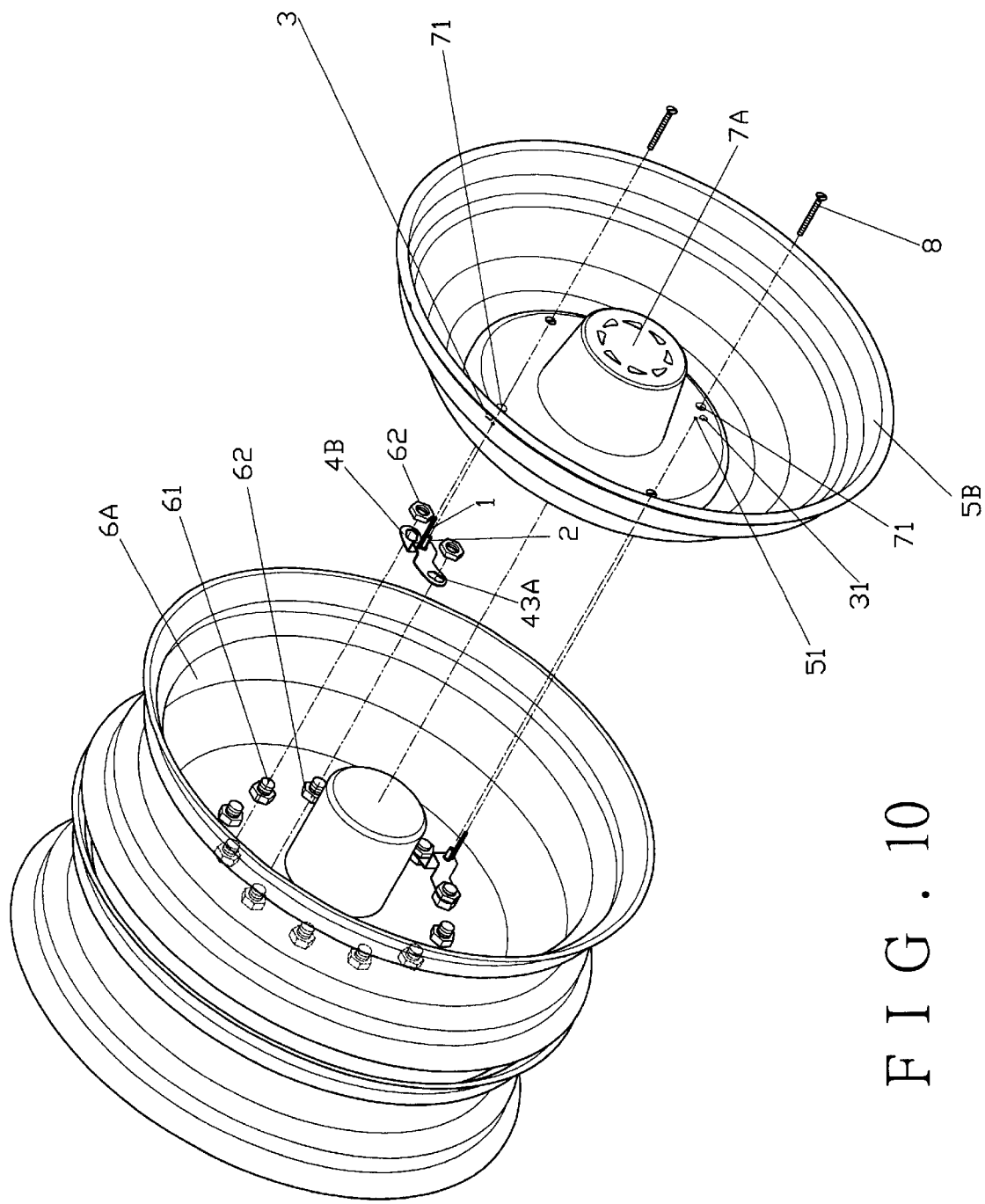
FIG. 10 is a exploded view of a second embodiment of the present invention incorporated a wheel cover.

FIGS. 9 through 11 show a second embodiment, which comprises a guiding rod 1, a guiding barrel 2, a guiding hole 3, a bracket 4B, a wheel cover 5B, a wheel 6A, a wheel axle cover 7A and bolts 8. The wheel axle cover 7A is secured to the wheel cover 5B, and both the wheel cover 5B and the wheel axle cover 7A are formed with locating holes 51 and 71. The bracket 4B and its locating hole 43A are the only difference of this embodiment with respect to the first embodiment. The other features are all the same and, therefore, will not be described hereinafter. It is to be noted that although there is a description of the inventive parts set forth herein, such as the guiding rod 1, the guiding barrel 2 and the guiding hole 3, other designs of the same parts shall fall within the scope of this invention as defined in the appended claims.

What is claim:

1. A wheel covering apparatus for a heavy-duty vehicle comprising:

a bracket configured for attachment to a wheel of the vehicle, said bracket having a guiding rod and a guiding barrel extending therefrom, said bracket having formed therein a threaded hole coaxially disposed relative to said guiding barrel;

a wheel cover coupled to said bracket, said wheel cover having formed therein a engagement hole and a guiding hole disposed in open communication therewith, said guiding hole being configured to receive and transversely guide said guiding rod into engagement with said engagement hole responsive to manipulation of said wheel cover relative to said bracket, said wheel cover having formed therein a first locating hole;

a wheel axle cover coupled to said wheel cover, said wheel axle cover having a second locating hole formed therein to align with said first locating hole; and, a bolt passing through said first and second locating holes and said guiding barrel to engage said threaded hole of said bracket for securing said wheel cover and wheel axle thereto.

2. The wheel covering apparatus as recited in claim 1 wherein said guiding rod includes a plurality of threads formed thereon.

3. The wheel covering apparatus as recited in claim 1 wherein said guiding rod includes a plurality of circular threads formed thereon.

4. The wheel covering apparatus as recited in claim 1 wherein said guiding rod includes a reduced portion formed intermediately thereon.

\* \* \* \* \*